Patented July 17, 1928.

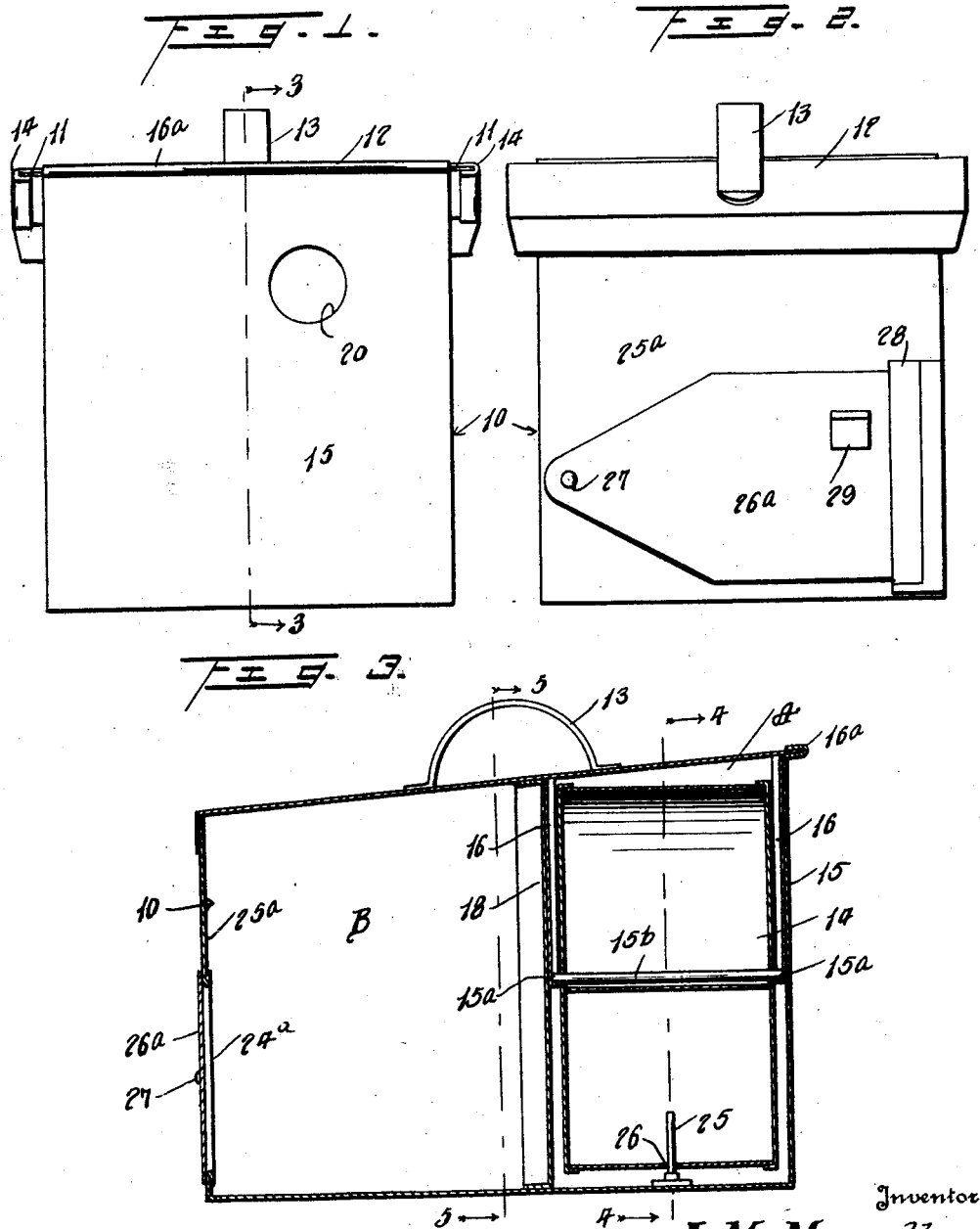

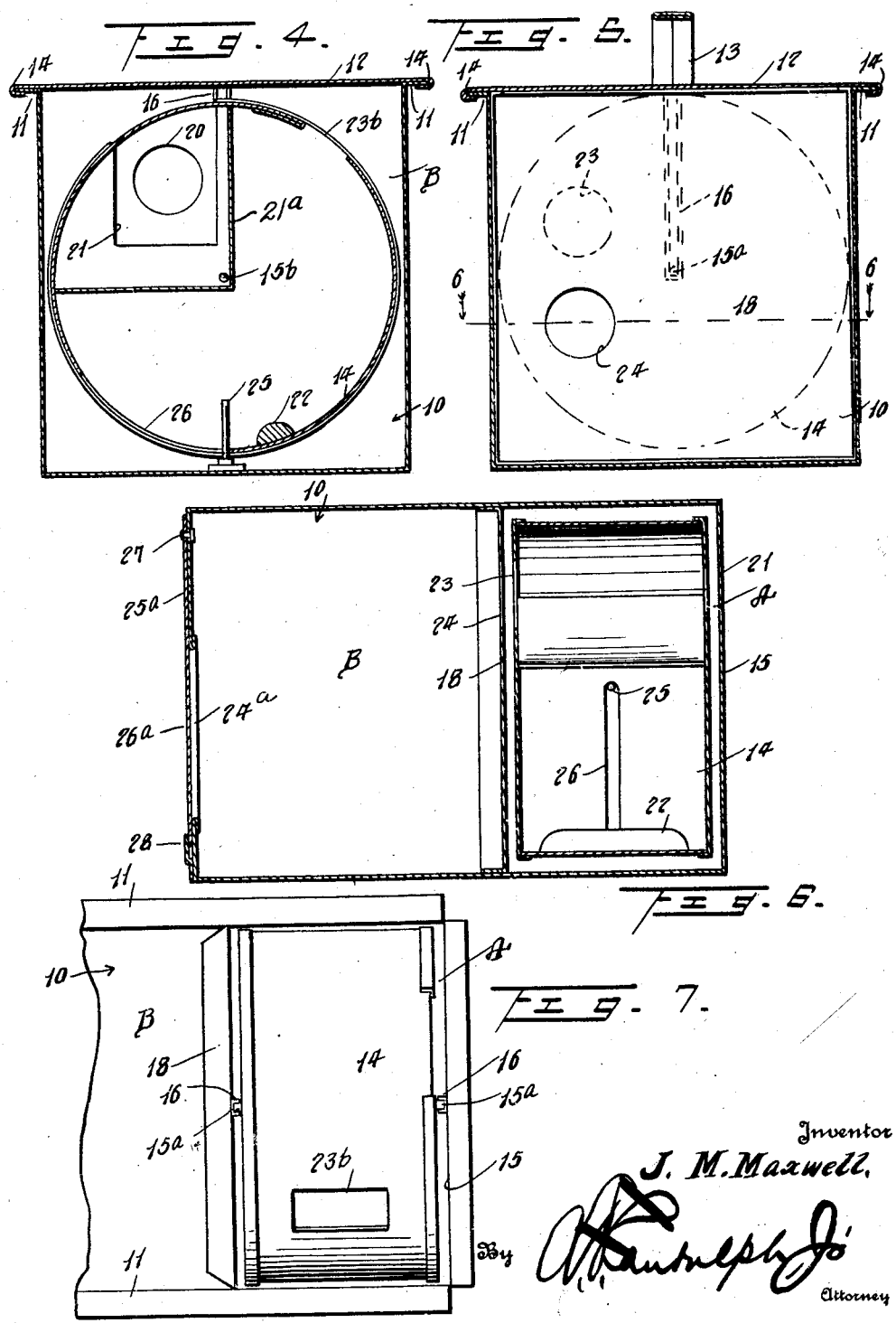

1,677,723

UNITED STATES PATENT OFFICE.

JOEL M. MAXWELL, OF SEDALIA, MISSOURI.

BIRD TRAP.

Application filed November 18, 1926. Serial No. 149,168.

This invention relates to a bird trap, and particularly to one adapted to catch English sparrows.

An important object is to provide a novel construction of trap which will automatically reset itself after catching a bird, so as to thus successively catch birds and be especially useful where undesired birds are to be caught and eliminated.

Another object is to provide a novel construction wherein the trap has a captive chamber in combination with a drum adapted to receive the birds and by the weight of the bird turn to place the same into position so that the bird may pass therefrom into the chamber, and the drum thereupon return to its initial or set position.

The more specific objects and advantages will become apparent from a consideration of the description following taken in connection with the accompanying drawings illustrating an operative embodiment.

In said drawings:—

Figure 1 is a front elevation of the trap;

Figure 2 is a rear elevation of the trap;

Figure 3 is a longitudinal sectional view taken on the vertical plane indicated by the line 3—3 of Figure 1;

Figure 4 is a transverse sectional view taken on the vertical plane indicated by the line 4—4 of Figure 3;

Figure 5 is a transverse sectional view taken on the vertical plane indicated by the line 5—5 of Figure 3;

Figure 6 is a longitudinal sectional view taken on the horizontal plane indicated by the line 6—6 of Figure 5; and Figure 7 is a top plan view of the trap with the cover removed.

Referring specifically to the drawings, the trap embodies a suitable box or receptacle generally designated 10 which may be made of any preferred material and usually wood or metal. As shown the box is made of metal and at the top of its sides, has outwardly extending flanges 11. Said box is open at the top and a closure 12 is slidably applicable thereto. The closure 12 is provided with a handle 13, and its side edges have hook flanges 14 to engage the flanges 11. The front wall 15 of the trap has a hook flange 16 adapted to engage the forward end of the closure 12 to form a stop for the latter in order that the latter will assume a proper position in closing the box.

The interior of the box is subdivided by a partition 18 into a catching chamber A and a captive chamber B. In the chamber A a catching drum 14 is supported for rocking movement. Said drum as shown is cylindrical and has trunnions $15^a$ formed by the ends of an axle or rod $15^b$ which are journaled in bearings 16 fastened one to the wall 15 and the other to the wall 18. Said bearings are generally of U-shape in cross section, open at the top and closed at their lower ends, so that the trunnions may have efficient bearing and will be capable of movement out of the bearings in removing the drum.

The front wall 15 has an entrance opening for the birds as at 20 which is normally in registration with an entrance opening 21 in the drum 14, the drum being held in such position due to the provision of a weight as at 22. The captive is received in a restricted space of the drum only, which is in registration with the opening 21 and defined by a partition $21^a$. An escape opening 23 is provided through the other end wall of the drum and at times is adapted to register with an escape opening 24 leading into the captive chamber B. As a result of this construction, after a bird enters the drum, it perches on the axle $15^b$ and its weight will overbalance the drum and move it to such a position that the openings 23 and 24 register whereupon the bird will fly in its terror through the openings 23 and 24 into the captive chamber B, after which, as the weight of the bird is removed from the drum, the latter will be restored to the initial reset or catching position. The movement of the drum to the catching and releasing positions is limited by means of a pin 25 on receptacle 10 which extends from the bottom of the latter into the interior of the trap and as through a slot 26 in drum 14, engagement of the pin with the respective end walls at the slot serving to limit the movement of the drum to its two positions of catching and releasing. An opening $23^b$ may be provided in the top of the drum to accommodate the fingers of the operator when applying or removing the drum.

Captive birds may be released whenever desired through an opening $24^a$ in the rear wall $25^a$, of the trap and which opening is normally closed by a plate $26^a$, fastened in any suitable way to the wall $25^a$ for instance by a pivot 27. A hook cleat 28 is provided on the rear wall $25^a$ to be engaged by the plate 26ª to hold it in secure position in closing the opening 24ª and a lug 29 may be provided on the plate to facilitate raising and lowering thereof. Of course, any other suitable form of closure may be substituted for that at 26ª.

It is also to be understood that the sliding cover 12 is shown by way of example since other forms of covers may be used, and for instance in a wooden structure, the same may be hinged to the box.

It is to be understood that the device is to be made so as to represent a nest generally and in this way serve to decoy birds into the same. If desired of course a perch may be provided on the wall 15 at the opening 20 and bait be placed thereon or within the drum.

Various changes may be resorted to provided they fall within the spirit and scope of the invention.

What is claimed is:—

1. A trap of the class described having a catching chamber and a captive chamber, a partition between said chambers having an opening therethrough, a drum in the catching chamber, means pivotally mounting said drum and forming a perch therein, means maintaining said drum normally in capturing position and in closing relation to said opening, said drum being over-balanced by a captive so that the same may pass therefrom through said opening into the captive chamber, and subsequently return to catching position, means to limit the movement of said drum comprising a pin extending from the box and the drum having an elongated slot coacting with the pin, and bearings carried one by the partition and one by an adjacent wall of the box, said bearings being open at the top and closed at the bottom, and trunnions on the drum removably engaging said bearings.

2. A trap of the class described having a catching chamber and a captive chamber, a partition between said chambers having an opening therethrough, a drum in the captive chamber, means pivotally mounting said drum, means maintaining said drum normally in capturing position and in closing relation to said opening, said drum being over-balanced by a captive so that the same may pass therefrom through said opening into the captive chamber and subsequently return to catching position, means to limit the movement of the drum comprising a pin extending from the box and the drum having an elongated slot coacting with the pin, bearings carried one by the partition and one by an adjacent wall of the box, said bearings being open at the top and closed at the bottom, trunnions on the drum removably engaging said bearings, and a displaceable closure on the trap normally preventing displacement of the drum relatively to said bearings.

In testimony whereof I affix my signature.

JOEL M. MAXWELL.